United States Patent
MacAdam et al.

(10) Patent No.: US 7,974,278 B1
(45) Date of Patent: Jul. 5, 2011

(54) PACKET SWITCH WITH CONFIGURABLE VIRTUAL CHANNELS

(75) Inventors: Angus David Starr MacAdam, Suwanee, GA (US); Robert Henry Bishop, Suwanee, GA (US); Bruce Lorenz Chin, Decatur, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 348 days.

(21) Appl. No.: 12/234,877

(22) Filed: Sep. 22, 2008

Related U.S. Application Data

(60) Provisional application No. 61/013,244, filed on Dec. 12, 2007.

(51) Int. Cl.
 *H04L 12/56* (2006.01)
 *H04L 12/50* (2006.01)
 *H04L 12/54* (2006.01)

(52) U.S. Cl. .................................. 370/389; 370/401

(58) Field of Classification Search ................. None
 See application file for complete search history.

(56) References Cited

U.S. PATENT DOCUMENTS

| | | | |
|---|---|---|---|
| 4,314,367 A | 2/1982 | Bakka et al. | |
| 5,260,935 A | 11/1993 | Turner | |
| 5,511,070 A | 4/1996 | Lyles | |
| 5,537,400 A | 7/1996 | Diaz et al. | |
| 6,014,690 A | 1/2000 | VanDoren et al. | |
| 6,124,878 A | 9/2000 | Adams et al. | |
| 6,222,848 B1 | 4/2001 | Hayward et al. | |
| 6,249,520 B1 | 6/2001 | Steely et al. | |
| 6,272,127 B1 | 8/2001 | Golden et al. | |
| 7,010,607 B1 | 3/2006 | Bunton | |
| 7,020,133 B2 | 3/2006 | Zhao et al. | |
| 7,145,904 B2 | 12/2006 | Zhao et al. | |
| 7,154,905 B2 | 12/2006 | Shin et al. | |
| 7,155,553 B2 | 12/2006 | Lueck et al. | |
| 7,210,056 B2 | 4/2007 | Sandven et al. | |
| 7,274,701 B2 | 9/2007 | Boduch et al. | |
| 7,304,987 B1 | 12/2007 | James et al. | |
| 7,305,492 B2 | 12/2007 | Bryers et al. | |
| 7,406,086 B2 | 7/2008 | Deneroff et al. | |

(Continued)

OTHER PUBLICATIONS

RapidIO Interconnet Specification Part 1: Input/output Logical Specification, RapidIO Trade Association, Revision 2.0, Mar. 2008.*

(Continued)

*Primary Examiner* — Pankaj Kumar
*Assistant Examiner* — Marcus R Smith
(74) *Attorney, Agent, or Firm* — Kenneth Glass; Stanley J. Pawlik; Glass & Associates

(57) ABSTRACT

A communication system includes a packet switch that routes data packets between endpoint devices in the communication system through virtual channels. The packet switch includes output ports each having a link bandwidth for outputting data packets. Each virtual channel is associated with an output port and is allocated a portion of the link bandwidth of the output port. The packet switch receives a data packet identifying a virtual channel at an input port, selects another virtual channel associated with the input port, routes the data packet through the packet switch, and outputs the data packet from the packet switch by using the selected virtual channel. Additionally, the packet switch may select a reliable transmission protocol, a continuous transmission protocol, or a pseudo-continuous transmission protocol for outputting the data packet from the packet switch. In some embodiments, the packet switch modifies the data packet to indicate the selected virtual channel.

25 Claims, 6 Drawing Sheets

U.S. PATENT DOCUMENTS

| | | | |
|---|---|---|---|
| 7,436,845 B1 * | 10/2008 | Rygh et al. | 370/413 |
| 7,529,217 B2 | 5/2009 | Pister et al. | |
| 7,602,811 B2 | 10/2009 | Porter et al. | |
| 7,606,151 B2 | 10/2009 | Chilukoor | |
| 7,724,734 B1 | 5/2010 | Grosser et al. | |
| 7,742,486 B2 | 6/2010 | Nielsen et al. | |
| 2001/0033552 A1 | 10/2001 | Barrack et al. | |
| 2002/0069271 A1 | 6/2002 | Tindal et al. | |
| 2002/0199205 A1 | 12/2002 | Sonawane et al. | |
| 2003/0107996 A1 | 6/2003 | Black et al. | |
| 2004/0017804 A1 | 1/2004 | Vishnu | |
| 2004/0103218 A1 | 5/2004 | Blumrich et al. | |
| 2004/0151209 A1 | 8/2004 | Cummings et al. | |
| 2005/0207436 A1 | 9/2005 | Varma | |
| 2006/0028987 A1 | 2/2006 | Gildfind et al. | |
| 2006/0039370 A1 * | 2/2006 | Rosen et al. | 370/389 |
| 2006/0120498 A1 | 6/2006 | Wong et al. | |
| 2006/0221948 A1 | 10/2006 | Benner et al. | |
| 2007/0067551 A1 * | 3/2007 | Ikeda et al. | 710/315 |
| 2007/0253439 A1 | 11/2007 | Iny | |
| 2008/0165768 A1 * | 7/2008 | Shah | 370/386 |
| 2009/0262732 A1 * | 10/2009 | Wood | 370/389 |

OTHER PUBLICATIONS

Xin Li, Latfi Mhamdi, Jung Liu, Konghong Pun, and Mournir Hamdi, "1.3 Buffered Crossbar Switches," High-performance Packet Switching Architectures, pp. 12-13 and 36-37, Springer London, Aug. 30, 2006.

Zhen Guo, Roberto Rojas-Cessa, and Nirwan Ansari "Packet Switch with Internally Buffered Crossbars," High-performance Packet Switching Architectures, pp. 121-146, Springer London, Aug. 30, 2006.

Kenji Yoshigoe and Ken Christensen "The Combined Input and Crosspoint Queued Switch," High-performance Packet Switching Architectures, pp. 169-195, Springer London, Aug. 30, 2006.

Xiao Zhang and Laxmi N. Bhuyan, "Deficit Round-Robin Scheduling for Input-Queued Switches" IEEE Journal on Selected Areas in Communications, pp. 584-594, vol. 21, No. 4, May 2003.

M Shreedhar and George Varghese, "Efficient Fair Queuing Using Deficit Round Robin" IEEE/ACM Transactions on Networking, pp. 375-385, vol. 4, No. 3, Jun. 1996.

Kang Xi, Shin'ichi Arakawa, Masayuki Murata, Ning Ge and Chongxi Feng, "Packet-Mode Scheduling with Proportional Fairness for Input-Queued Switches" IEICE Trans. Commun., pp. 4274-4284, vol.E88-B, No. 11 Nov. 2005.

* cited by examiner

200 ↘
| 500 Port Identifier | 505 Virtual Channel Identifier |
|---|---|
| 500 Port Identifier | 505 Virtual Channel Identifier |
| ⋮ | ⋮ |
| 500 Port Identifier | 505 Virtual Channel Identifier |
FIG. 5
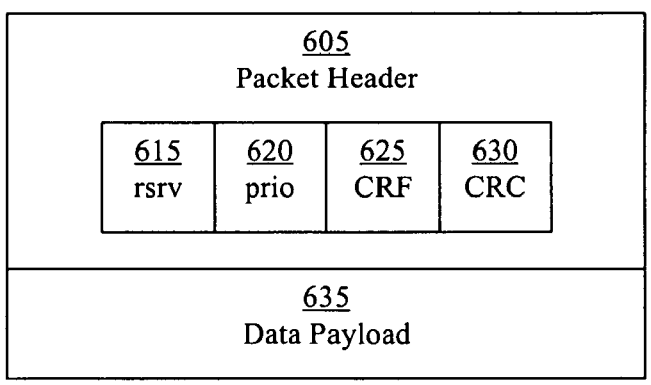
FIG. 6
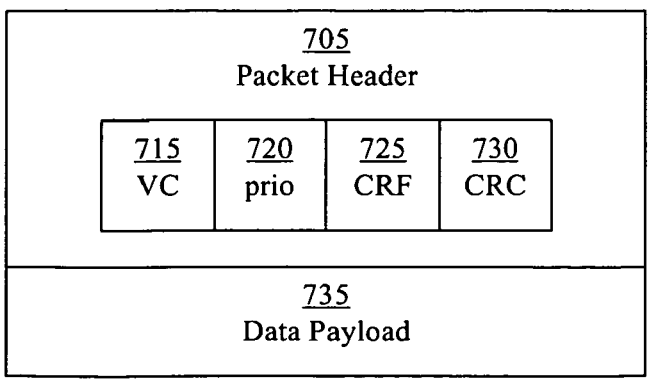
FIG. 7

PACKET SWITCH WITH CONFIGURABLE VIRTUAL CHANNELS

CROSS-REFERENCE TO RELATED APPLICATION

The present application claims benefit of U.S. Provisional Application Ser. No. 61/013,244, filed Dec. 12, 2007, entitled "Next-Generation SRIO Switching Devices and Methods," which is incorporated herein by reference in its entirety.

BACKGROUND

Serial RapidIO (sRIO) is a high-performance packet-based interconnect technology specified by a communication standard and used in many communication systems. In these communication systems, packet switches based on an sRIO standard route data packets between endpoint devices in the communications systems. Although some of these packet switches are based on the sRIO 1.3 standard, it is anticipated that future communication systems will use packet switches based on the sRIO 2.0 standard. In particular, the sRIO 2.0 standard provides for virtual channels (VC0-VC8), which are not specified in the sRIO 1.3 standard. The virtual channels specified in the sRIO 2.0 standard provide a mechanism that allows the bandwidth of a data link to be allocated among different streams of unrelated data in a manner that ensures that each stream, or group of streams, receives a guaranteed minimum fraction of the bandwidth in the data link.

As communications systems evolve from the sRIO 1.3 standard to the sRIO 2.0 standard, it is likely that some of these communications systems will contain both endpoint devices compliant with the sRIO 1.3 standard and other endpoint devices compliant with the sRIO 2.0 standard. One technique for employing both of these sRIO standards in a communication system involves fragmenting the communication system such that endpoint devices compliant with the sRIO 1.3 standard are isolated from those endpoint devices compliant with the sRIO 2.0 standard. Such a fragmented communication system, however, has limited practicality for endpoint devices operating as an embedded system interconnect. Another technique for employing both of these sRIO standards in a communication system involves using virtual channel zero (VC0) as specified in the sRIO 2.0 standard.

To facilitate migration of communication systems from the sRIO 1.3 standard to the sRIO 2.0 standard, the sRIO 2.0 standard specifies a low-level virtual channel (VC0) that is backward compatible with the sRIO 1.3 standard. This virtual channel uses a reliable transmission protocol that allows endpoint devices compliant with the sRIO 1.3 standard to communicate with endpoint devices compliant with the sRIO 2.0 standard in a communication system. The reliable transmission protocol is a lossless protocol that requires retransmission of a data packet lost during initial transmission of the data packet to an endpoint device in the communication system. For example, a data packet may be lost if the data packet is corrupt or the endpoint device does not presently have storage capacity to store the data packet.

A device compliant with the sRIO 1.3 standard, however, may not effectively communicate with a device compliant with the sRIO 2.0 standard over higher-level virtual channels (VC1-VC8), which may be configured to use either the reliable transmission protocol or a continuous transmission protocol. The continuous transmission protocol is a low-latency lossy protocol that requires a data packet not correctly received by an endpoint device in the communication system to be discarded and not retransmitted to the endpoint device. Thus, a device compliant with the sRIO 1.3 standard may not effectively communicate with a device compliant with the sRIO 2.0 standard by using the continuous transmission protocol.

In light of the above, a need exists for a communication system with improved communication between endpoint devices compliant with different communication standards or different versions of a communication standard. A further need exists for a packet switch that facilitates communication between endpoint devices compliant with the serial RapidIO 1.3 standard and endpoint devices compliant with the serial RapidIO 2.0 standard through virtual channels.

SUMMARY

In various embodiments, a communication system includes a packet switch that routes data packets between endpoint devices through one or more virtual channels. Each of the virtual channels is allocated a portion of bandwidth of an output port in the packet switch (e.g., a link bandwidth of the output port) and includes a virtual channel identifier identifying the virtual channel. The packet switch receives a data packet, selects a virtual channel associated with the output port based on the data packet, and routes the data packet through the packet switch by using the virtual channel. In further embodiments, the packet switch selects a transmission protocol for outputting (e.g., transmitting) the data packet from the packet switch. In some embodiments, the input port modifies the data packet to include a virtual channel identifier identifying the selected virtual channel.

In some embodiments, the packet switch receives a data packet conforming to a RapidIO 1.3 standard. In these embodiments, the packet switch selects a virtual channel based on the data packet and uses the virtual channel to route the data packet through the packet switch. For example, the packet switch may select a higher-level virtual channel (VC1-VC8) of the sRIO 2.0 standard based on the data packet. In a further embodiment, the packet switch modifies the data packet so that it contains a virtual channel identifier identifying the selected virtual channel and conforms to a RapidIO 2.0 standard. The packet switch outputs the modified data packet to an endpoint device conforming to the RapidIO 2.0 standard. In this way, an endpoint device conforming to the RapidIO 1.3 standard may effectively communicate with an endpoint device conforming to the RapidIO 2.0 standard through a packet switch by using a virtual channel. In some embodiments, a communication system includes more than one packet switch. In various embodiments, a packet switch is an endpoint device in a communication system.

In one embodiment, the packet switch receives a data packet conforming to a RapidIO 2.0 standard. In this embodiment, the packet switch modifies the data packet to contain a virtual channel identifier identifying the selected virtual channel. For example, the data packet may include a virtual channel identifier identifying a higher-level virtual channel (VC1-VC8) and the packet switch may select virtual channel zero (e.g., VC0) based on the data packet and modify the data packet to include a virtual channel identifier identifying virtual channel zero. Further, the packet switch routes the data packet through the packet switch by using the selected virtual channel. In a further embodiment, the modified data packet conforms to a serial RapidIO 2.0 standard and is backward compatible with a serial RapidIO 1.3 standard. Moreover, the packet switch outputs the modified data packet to an endpoint device that conforms to the serial RapidIO 1.3 standard. In this way, an endpoint device conforming to the RapidIO 2.0 standard may effectively communicate with an endpoint device conforming to the RapidIO 1.3 standard through the packet switch by using a virtual channel.

A packet switch, in accordance with one embodiment, includes a plurality of ports and a switch fabric coupled to the plurality of ports. The plurality of ports includes a first port and a second port. The first port is configured to receive a first data packet identifying a virtual channel and select another virtual channel based on the first data packet. The switch fabric is configured to route the first data packet to the second port. The second port is configured to output the first data packet from the packet switch by using the selected virtual channel.

A communication system, in accordance with one embodiment, includes a source device, a destination device, and a packet switch coupled to the source device and the destination device. The packet switch includes a plurality of ports including a first port and a second port. The first port is configured to receive a first data packet identifying a virtual channel from the source device and select a virtual channel based on the first data packet. The switch fabric is configured to route the first data packet to the second port. The second port is configured to output the first data packet to the destination device by using the selected virtual channel.

A method of routing a data packet through a packet switch, in accordance with one embodiment, includes receiving a first data packet identifying a virtual channel identifier at a first port of the packet switch and selecting another virtual channel based on the first data packet. Further, the method includes routing the first data packet to a second port of the packet switch and outputting the first data packet from the packet switch at the second port by using the selected virtual channel.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 5 is a block diagram of a route table, in accordance with an embodiment of the present invention.

FIG. 6 is a block diagram of a data packet, in accordance with an embodiment of the present invention.

FIG. 7 is a block diagram of a data packet, in accordance with an embodiment of the present invention.

DETAILED DESCRIPTION

In various embodiments, a communication system includes a packet switch that routes data packets between endpoint devices in the communication system through one or more virtual channels. Each of the virtual channels is identified by a virtual channel identifier and is allocated a portion of bandwidth of a corresponding output port in the packet switch (e.g., a portion of link bandwidth). The packet switch receives a data packet at an input port, selects a virtual channel based on the data packet, and routes the data packet to an output port of the packet switch. In turn, the output port outputs the data packet from the packet switch by using the selected virtual channel. In a further embodiment, the packet switch modifies the data packet to include the virtual channel identifier identifying the selected virtual channel.

Figure 1:
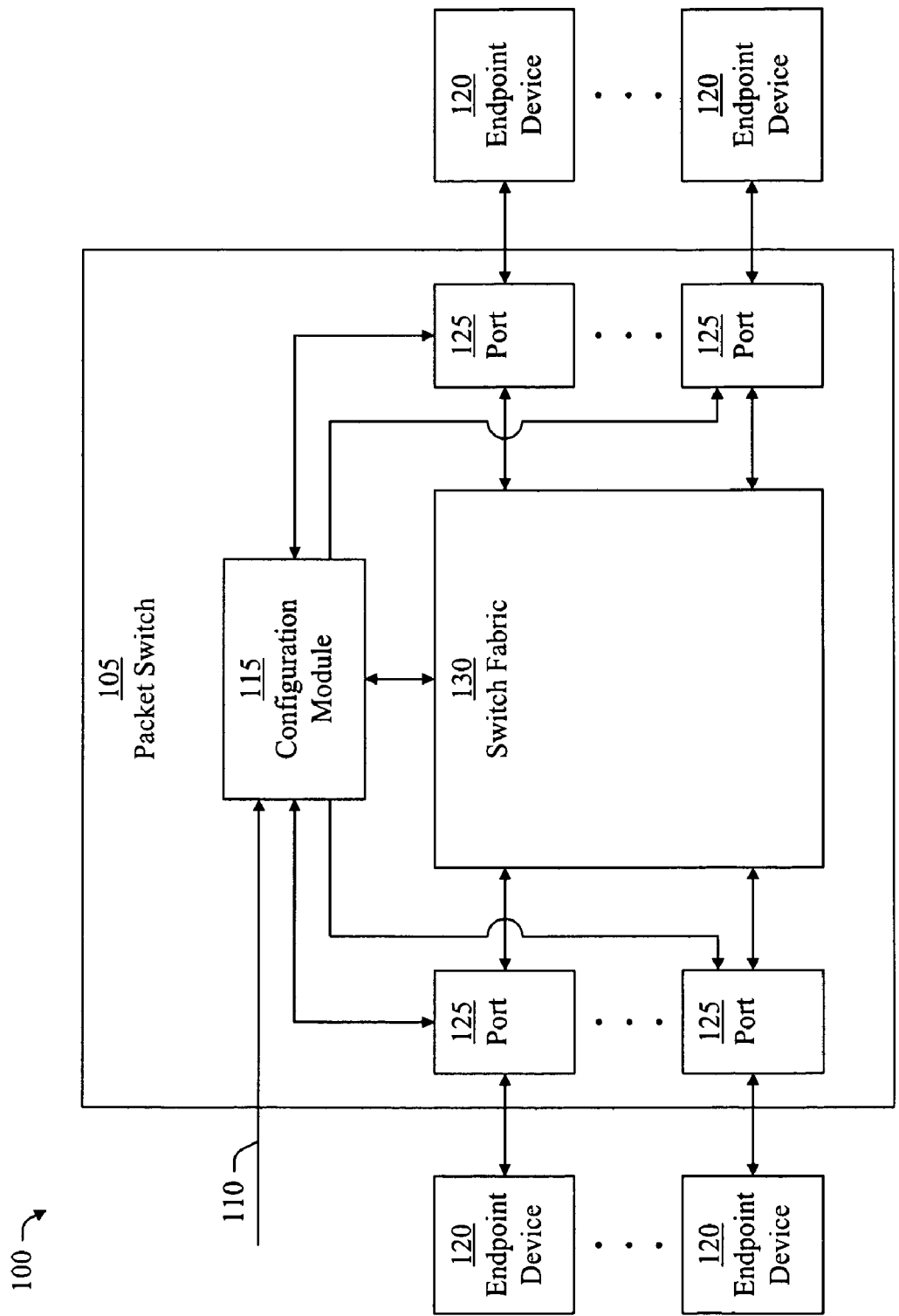
FIG. 1 is a block diagram of a communication system, in accordance with an embodiment of the present invention.

FIG. 1 illustrates a communication system 100, in accordance with one embodiment of the present invention. The communication system 100 includes a packet switch 105 and endpoint devices 120 coupled (e.g., connected) to the packet switch 105. Each of the endpoint devices 120 may send data packets to the packet switch 105 or receive data packets from the packet switch 105, or both. For example, an endpoint device 120 may be an input device (e.g., a source device), an output device (e.g., a destination device), or an input-output device. As another example, an endpoint device 120 may be another packet switch 105. In various embodiments, an endpoint device 120 sends a data packet to the packet switch 105 and the packet switch 105 selects a virtual channel based on the data packet. Further, the packet switch 105 routes the data packet to another endpoint device 120 based on the data packet by using the virtual channel. Moreover, the virtual channel has an allocated portion of a link bandwidth of the packet switch 105. For example, the packet switch 105 may output data packets to an endpoint device 120 through a data link and a user may configure (e.g., program) the packet switch 105 to allocate a portion of bandwidth of the data link to the virtual channel. Moreover, the packet switch 105 may use multiple virtual channels, each of which is allocated a portion of the bandwidth of a link (e.g., a portion of a link bandwidth).

In one embodiment, the packet switch 105 receives a data packet identifying virtual channel zero (VC0) from an endpoint device 120. For example, the data packet may conform to the sRIO 1.3 standard and identify virtual channel zero according to a backward compatibility mode specified in the sRIO 2.0 standard. In turn, the packet switch 105 selects a virtual channel other than the virtual channel identified by the data packet based on the data packet. Further, the packet switch 105 routes the data packet to another endpoint device 120 based on the data packet and by using the selected virtual channel. In this way, the packet switch 105 uses a virtual channel to route the data packet through the packet switch 105 even though the data packet received by the packet switch 105 does not include a virtual channel identifier identifying that virtual channel. Moreover, the packet switch 105 enhances the capability of endpoint devices 120 compliant with the sRIO 1.3 standard to effectively communicate with endpoint devices 120 compliant with the sRIO 2.0 standard.

In one embodiment, the endpoint devices 120 are compliant with the sRIO 1.3 standard and the packet switch 105 is compliant with the sRIO 2.0 standard. In this embodiment, the packet switch 105 receives a data packet compliant with the sRIO 1.3 standard from one of the endpoint devices 120, selects a higher-level virtual channel (e.g., VC1-VC8) of the sRIO 2.0 standard based on the data packet, and routes the data packet through the packet switch 105 using the selected virtual channel. Further, in this embodiment, the packet switch 105 does not modify the data packet to include a virtual channel identifier identifying the selected virtual channel. Additionally, the packet switch 105 outputs the data packet, which is compliant with the sRIO 1.3 standard, from the packet switch 105 to another endpoint device 120 by using the selected virtual channel.

In a further embodiment, the packet switch 105 modifies the data packet received by the packet switch 105 such that the data packet includes a virtual channel identifier identifying the selected virtual channel. In this embodiment, the packet switch 105 also calculates a cyclical redundancy code for the modified data packet and replaces a cyclical redundancy code in the modified data packet with the calculated cyclical redundancy code. Moreover, the packet switch 105 may route the modified data packet including the replacement cyclical redundancy code to an endpoint device 120 conforming to the sRIO 2.0 standard by using the selected virtual channel. In this way, the packet switch 105 uses a virtual channel to facilitate communication between endpoints devices conforming to different communication standards or different versions of a communication standard.

In some embodiments, the packet switch 105 selects a transmission protocol for the virtual channel. In various embodiments, the transmission protocol may be a reliable transmission protocol, a continuous transmission protocol, or a pseudo-continuous transmission protocol. The reliable transmission protocol is a lossless packet-based communication protocol that requires retransmission of data packets that are not correctly received by the packet switch 105 or an endpoint device 120. For example, a data packet may not be correctly received by the packet switch 105 if the data packet is corrupt (e.g., includes a data error) or the packet switch 105 does not presently have storage capacity to store the data packet. The continuous transmission protocol is a lossy packet-based communication protocol that requires data packets that are not correctly received by the packet switch 105 or an endpoint device 120 to be discarded. Because data packets not correctly received by the packet switch 105 or an endpoint device 120 are discarded, the continuous transmission protocol generally has a lower latency than the reliable transmission protocol. The pseudo-continuous transmission protocol uses a reliable transmission protocol (e.g., a lossless communication protocol) to imitate a continuous transmission protocol (e.g., a lossy communication protocol), as is described more fully herein.

In various embodiments, the reliable transmission protocol is specified in the sRIO 1.3 standard or the sRIO 2.0 standard, or both, and the continuous transmission protocol is specified in the sRIO 2.0 standard. In various embodiments, the packet switch 105 is configurable (e.g., programmable) to select a virtual channel based on a data packet received by the packet switch 105 and to select a transmission protocol for the virtual channel, as is described more fully herein.

In one embodiment, the packet switch 105 includes a configuration module 115, ports 125, and a switch fabric 130. The switch fabric 130 is coupled (e.g., connected) to the configuration module 115 and each of the ports 125. Further, each of the ports 125 is coupled (e.g., connected) to a corresponding endpoint device 120 and to the configuration module 115. Each of the ports 125 may be an input port, an output port, or an input-output port. In various embodiments, a first port 125 (e.g., an input port) receives a data packet from the endpoint device 120 corresponding to the first port 125 and selects both a virtual channel and a second port 125 (e.g., an output port) based on the data packet. The switch fabric 130 routes the data packet to the identified port 125 and the identified port 125 outputs the data packet to the endpoint device 120 corresponding to the identified port 125 by using the selected virtual channel. In some embodiments, the switch fabric 130 routes the data packet to the identified port 125 by using the selected virtual channel.

The configuration module 115 configures (e.g., programs) the packet switch 105, for example based on information received from a user through the communication channel 110. In various embodiments, the configuration module 115 may configure the packet switch 105 to use one or more virtual channels, each of which is identified by a virtual channel identifier, and to allocate a portion of link bandwidth of the packet switch 105 to each virtual channel. Additionally, the configuration module 115 may select a transmission protocol for a data packet or a virtual channel. For example, the configuration module 115 may select a reliable transmission protocol, a continuous transmission protocol, or a pseudo-continuous transmission protocol for outputting a data packet from the packet switch 105. Additionally, the configuration module 115 configures the packet switch 105 to map data packets to virtual channels based on the contents of the data packets.

In one embodiment, a first port 125 receives a first data packet from the endpoint device 120 corresponding to the port 125, selects a virtual channel based on the first data packet, and selects a pseudo-continuous transmission protocol for the virtual channel. In this embodiment, the packet switch 105 uses a reliable transmission protocol (e.g., a lossless communication protocol) to imitate a continuous transmission protocol (e.g., a lossy communication protocol). Additionally, the first port 125 identifies a second port 125 based on the first data packet and the switch fabric 130 routes the first data packet to the second port 125 (e.g., an output port). In turn, the second port 125 outputs the first data packet to the endpoint device 120 corresponding to the second port 125 by using the selected virtual channel and the selected transmission protocol. In another embodiment, the second port 125 selects the transmission protocol for outputting the first data packet to the endpoint device 120 corresponding to the second port 125. In some embodiments, the switch fabric 130 routes the first data packet to the second port 125 by using the selected virtual channel. For example, the selected virtual channel may be virtual channel zero (VC0) and the switch fabric 130 may route the first data packet to the second port 125 by using virtual channel zero (VC0).

In some instances, second port 125 may output the first data packet along with an acknowledgement identifier to the endpoint device 120 corresponding to the second port 125 but the endpoint device 120 will not correctly receive the first data packet output from the second port 125 according to the pseudo-continuous transmission protocol. For example, the first data packet may be corrupt (e.g., contain a data error) or the endpoint device 120 may not have storage capacity to store the first data packet. In these instances, the endpoint device 120 corresponding to the second port 125 discards the first data packet and requests retransmission of the first data packet by sending a status indicator (e.g., a control symbol) including the acknowledgement identifier to the second port 125 indicating that the endpoint device 120 did not accept the first data packet. In turn, the second port 125 determines based on the status indicator that the second port 125 did not accept the first data packet.

In some embodiments, the acknowledgement identifier output from the second port 125 along with the first data packet is included in the first data packet. In other embodiments, the acknowledgement identifier output from the second port 125 along with the first data packet is a control symbol associated with the first data packet.

Additionally, the first port 125 receives a second data packet from the endpoint device 120 corresponding to the first port 125, selects the virtual channel based on the second data packet, and identifies the second port 125 based on the second data packet. For example, the first data packet and the second data packet may be data packets in a data stream. The switch fabric 130 routes the second data packet to the second port 125. The second port 125 outputs the second data packet to the endpoint device 120 corresponding to the second port 125 along with the acknowledgement identifier of the first data packet by using the selected virtual channel. In turn, the endpoint device 120 corresponding to the second port 125 accepts the second data packet and identifies the acknowledgement identifier sent with the second data packet.

Because the acknowledgement identifier output to the endpoint device 120 by the second port 125 along with the second data packet matches the acknowledgement identifier output by the second port 125 along with the first data packet, the endpoint device 120 identifies the second data packet as a retransmitted first data packet. In this way, the first data packet is replaced by the second data packet and the packet switch 105 uses the reliable transmission protocol to imitate a continuous transmission protocol. In various embodiments, the endpoint device 120 corresponding to the second port 125 and the reliable transmission protocol conform to the sRIO 1.3 standard. In some embodiments, the endpoint device 120 corresponding to the second port 125 and the reliable transmission protocol conform to the sRIO 2.0 standard.

In another embodiment, a port 125 other than the first port 125 receives the second data packet from the endpoint device 120 corresponding to that port 125, selects the virtual channel based on the second data packet, and identifies the second port 125 based on the second data packet. In turn, the switch fabric 130 routes the second data packet to the second port 125. Further, the second port 125 uses the selected virtual channel to output the second data packet to the endpoint device 120 corresponding to the second port 125 along with the acknowledgement identifier of the first data packet. In turn, the endpoint device 120 corresponding to the second port 125 identifies the acknowledgement identifier received with the second data packet and accepts the second data packet. In some embodiments, the port 125 (e.g., the input port 125) receiving the second data packet selects another virtual channel for the second data packet and the second port 125 outputs the second data packet by using this other virtual channel. In this way, the first data packet and the second data packet are output from the second port 125 by using different virtual channels.

Figure 2:
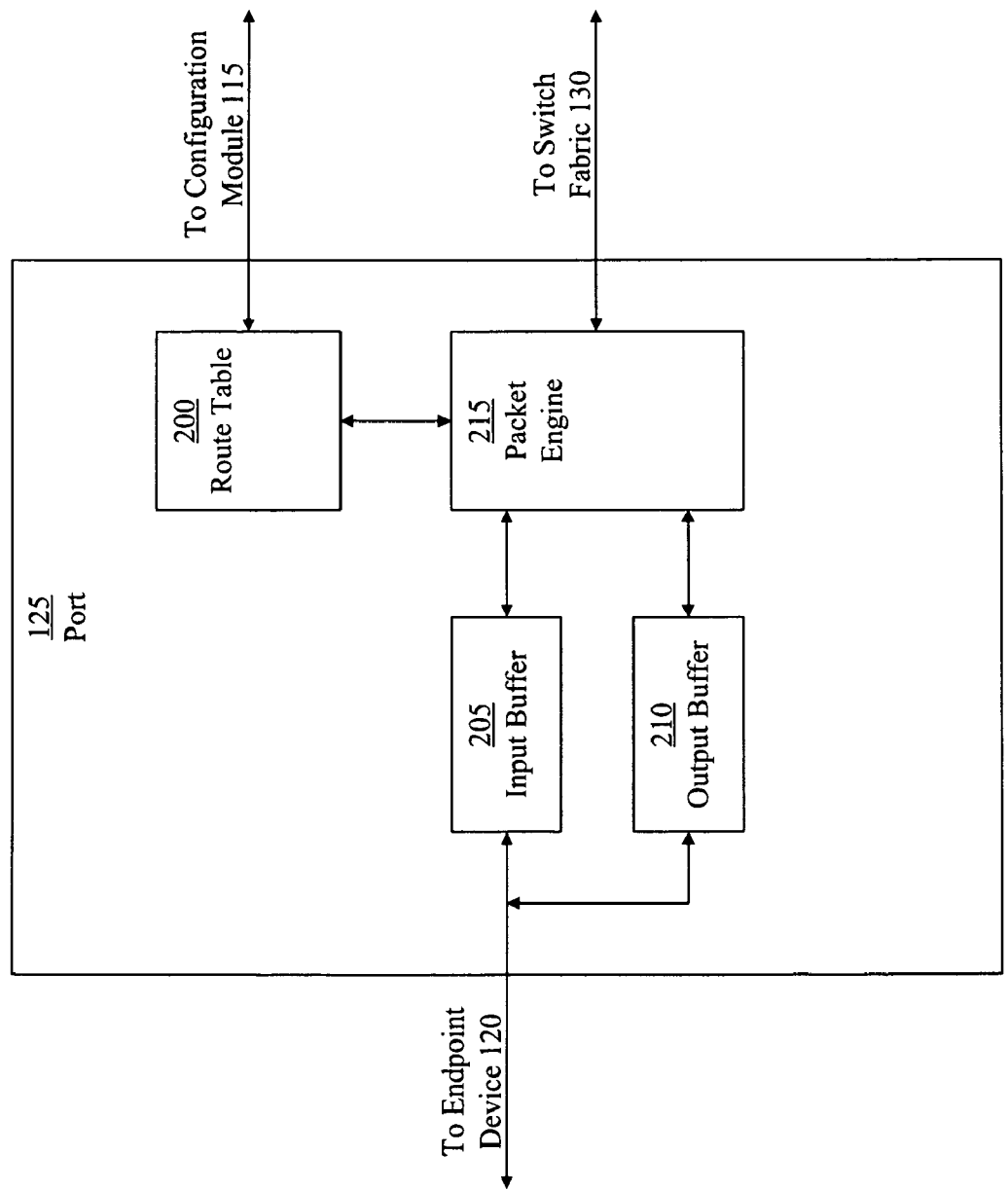
FIG. 2 is a block diagram of a port in a packet switch, in accordance with an embodiment of the present invention.

FIG. 2 illustrates a port 125, in accordance with an embodiment of the present invention. The port 125 includes a route table 200, an input buffer 205, an output buffer 210, and a packet engine 215. The packet engine 215 is coupled to the route table 200, the input buffer 205, and the output buffer 210. The input buffer 205 stores data packets, or portions thereof, received by the port 125 from the endpoint device 120 corresponding to the port 125. The output buffer 210 stores data packets, or portions thereof, received by the port 125 from the switch fabric 130. The route table 200 maps a data packet received by the port 125 to another port 125 (e.g., a destination port) in the packet switch 105 based on the data packet. Additionally, the route table 200 maps the data packet to a virtual channel based on the data packet.

In various embodiments, the port 125 selects a virtual channel for a data packet by identifying a virtual channel in the route table 200 based on contents (e.g., a destination identifier) in the data packet. Further, the port 125 identifies a port 125 (e.g., an output port) for the data packet by identifying a port identifier in the route table 200 based on contents (e.g., a destination identifier) in the data packet. In some embodiments, the port 125 selects a transmission protocol for the data packet or the virtual channel. For example, a port 125 (e.g., an input port or an output port) may select a transmission protocol for a data packet before an output port 125 outputs the data packet from the packet switch 105 to an endpoint device 120.

The packet engine 215 provides data packets stored in the input buffer 205 to the switch fabric 130 and writes data packets received by the port 125 from the switch fabric 130 into the output buffer 210. In some embodiments, the input buffer 205 or the output buffer 210 is optional. For example, a port 125 that functions as an input port may not include an output buffer 210 and a port 125 that functions as an output port may not include an input buffer 205.

In some embodiments, a port 125 (e.g., an input port) receives a data packet from an endpoint device 120 (e.g., a source device), identifies the data packet as a multicast packet, and multicasts the data packet to multiple ports 125 (e.g., output ports) of the packet switch 105. For example, a port 125 may receive a data packet from an endpoint device 120, identify the data packet as a multicast data packet, and identify multiple port identifiers based on the route table 200 and contents (e.g., a destination identifier) of the data packet. In turn, the switch fabric 130 routes the data packet to each port 125 identified by the port identifiers. Further, the port 125 may select one or more virtual channels for routing the data packet (e.g., the multicast packet) through the packet switch 105 based the selected port identifiers. For example, the port 125 may select virtual channel one (VC1) for the data packet routed to one port 125 and virtual channel five (VC5) for the data packet routed to another port 125.

In some embodiments, a port 125 (e.g., an output port) receives data packets having different virtual channel identifiers, modifies the virtual channel identifier of one or more of the data packets such that the data packets indicate the same virtual channel, and outputs the data packets from the packet switch 105 by using that same virtual channel. Further, the port 125 outputs the data packets from the packet switch 105 in the order the port 125 received the data packets. In this way, the port 125 maintains the order in which the port 125 received the data packets. In other embodiments, a port (e.g., an output port) receives data packets identifying different virtual channels, modifies a priority of one or more of the data packets such that each of data packets has a same priority and conforms to the sRIO 1.3 standard, and outputs the data packets from the packet switch 105 by using virtual channel zero (VC0). In these embodiments, each of the modified data packets identifies virtual channel zero (VC0) according to the sRIO 2.0 standard and is backward compatible with the sRIO 1.3 standard.

In one embodiment, a port 125 (e.g., an output port) receives a data packet indicating a priority and compliant with the sRIO 1.3 standard and another data packet indicating a higher-level virtual channel (e.g., VC1-VC8) and compliant with the sRIO 2.0 standard. In this embodiment, the port 125 selects virtual channel zero (VC0) for both data packets and modifies the data packet indicating the higher-level virtual channel such that the data packet indicates virtual channel zero (VC0). As a result, the modified data packet indicates a priority according to the sRIO 1.3 standard. Further, the port 125 modifies the priority of one of more of the data packets such that both data packets have the same priority. Additionally, the port 125 outputs the data packets from the packet switch 105 in the same order in which the port 125 received the data packets. In this way, the port 125 maintains the order in which the port 125 received the data packets and outputs the data packet so that each of the data packets has the same priority. In this embodiment, each of the modified data packets identifies virtual channel zero (VC0) according to the sRIO 2.0 standard and is backward compatible with the sRIO 1.3 standard. In a further embodiment, the port 125 selects a reliable transmission protocol for the data packets.

Figure 3:
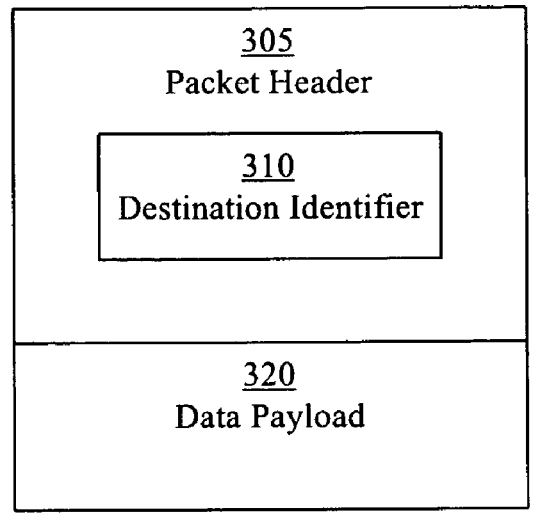
FIG. 3 is a block diagram of a data packet, in accordance with an embodiment of the present invention.

FIG. 3 illustrates a data packet 300, in accordance with an embodiment of the present invention. The data packet 300 includes a packet header 305 and an optional data payload 320. The packet header 305 includes a destination identifier 310 for identifying a destination of the data packet 300. In various embodiments, the packet switch 105 selects a virtual channel for the data packet 300 based on the destination identifier 310 in the data packet 300. In some embodiments, the packet switch 105 selects a virtual channel for the data packet 300 based on the data payload 320. For example, the packet switch 105 may identify a data pattern in the data payload 320 and select the virtual channel based on the data pattern. In other embodiments, the packet switch 105 selects a virtual channel for the data packet 300 based on both the packet header 305 and the data payload 320. In some embodiments, the data packet 300 conforms to the sRIO 1.3 standard.

Figure 4:
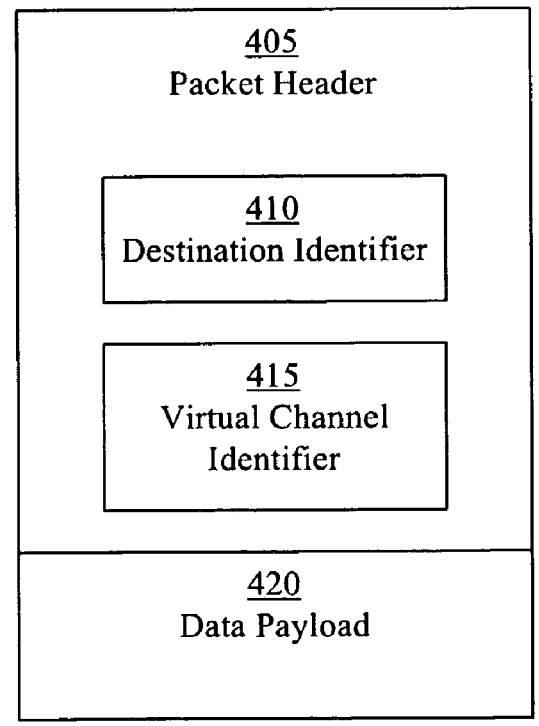
FIG. 4 is a block diagram of a data packet, in accordance with an embodiment of the present invention.

FIG. 4 illustrates a data packet 400, in accordance with an embodiment of the present invention. The data packet 400 includes a packet header 405 and an optional data payload 420. The packet header 405 includes a destination identifier 410 for identifying a destination of the data packet 400. Additionally, the packet header 405 includes a virtual channel identifier 415 identifying a first virtual channel. In various embodiments, the packet switch 105 maps the first virtual channel to a second virtual channel by selecting a second virtual channel for the data packet 400 based on the destination identifier 410 or the virtual channel identifier 415, or both. For example, the packet switch 105 may select the second virtual channel by identifying the second virtual channel from the route table 200 based on the destination identifier 410 or the virtual channel identifier 415, or both. Further, the packet switch 105 routes the data packet 400 through the packet switch 105 by using the second virtual channel.

In some embodiments, the packet switch 105 modifies the data packet 400 by replacing the virtual channel identifier 415 in the data packet 400, which identifies the first virtual channel, with a virtual channel identifier 415 identifying the second virtual channel. For example, the virtual channel identifier 415 in the data packet 400 may identify a higher-level virtual channel (e.g., virtual channels 1-8) in the sRIO 2.0 standard and the replacement virtual channel identifier 415 may identify another virtual channel in the sRIO 2.0 standard. As another example, the virtual channel identifier 415 in the data packet 400 may identify virtual channel zero (VC0) in the sRIO 2.0 standard and the replacement virtual channel identifier 415 may identify a higher-level virtual channel (VC1-8) in the sRIO 2.0 standard.

In some embodiments, the packet switch 105 selects a virtual channel (e.g., the second virtual channel) for the data packet 400 based on the data payload 420. For example, the packet switch 105 may identify a data pattern in the data payload 420 and select the virtual channel based on the data pattern. In other embodiments, the packet switch 105 selects a virtual channel for the data packet 400 based on both the packet header 405 and the data payload 420. In some embodiments, the data packet 400 conforms to the sRIO 2.0 standard.

FIG. 5 illustrates the route table 200, in accordance with an embodiment of the present invention. The route table 200 includes port identifiers 500 and virtual channel identifiers 505. The route table 200 maps data packets to a port identifier 500 and a virtual channel identifier 505. For example, the route table 200 may be a memory device, such as random access memory (RAM), containing locations for storing the port identifiers 500 and the virtual channel identifiers 505.

In some embodiments, the configuration module 115 writes the port identifiers 500 and the virtual channel identifiers 505 into the route table 200 based on user input provided to the configuration module 115 through the communication channel 110. For example, the user input may include a data packet including a port identifier 500 and a virtual channel identifier 505 as well an index identifying a location in the route table 200 for storing the port identifier 500 and the virtual channel identifier 505. In this way, the configuration module 115 configures (e.g., programs) the route table 200 based on the user input.

FIG. 6 illustrates a data packet 600, in accordance with an embodiment of the present invention. In various embodiments, the data packet 600 is compliant with the sRIO 1.3 standard. The data packet 600 includes a packet header 605 and a data payload 635. The packet header 605 includes a reserved field (rsrv) 615 including a reserved bit, a priority field (prio) 620 for specifying a priority of the data packet 600, a critical request field (CRF) 625 for indicating a critical request flow for differentiating between data packets of equal priority, and a cyclical redundancy code field (CRC) 630 for a cyclical redundancy code. In various embodiments, the priority field 620 is a bit field including two bits for specifying a lowest priority, a medium priority, a high priority, and a highest priority. For example, the priority field 620 may contain a binary value 0b00 for specifying a lowest priority, a binary value of 0b01 for specifying a medium priority, a binary value of 0b10 for specifying a high priority, or a binary value of 0b11 for specifying a highest priority. In various embodiments, the data packet 600 includes additional fields in the packet header 605. For example, the packet header 605 may include a field for indicating a destination identifier (e.g., destination identifier 310).

FIG. 7 illustrates a data packet 700, in accordance with an embodiment of the present invention. In various embodiments, the data packet 700 conforms to the sRIO 2.0 standard. The data packet 700 includes a packet header 705 and a data payload 735. The packet header 705 includes a virtual channel field (VC) 715 for indicating use of a virtual channel and a priority field (prio) 720 for specifying a virtual channel or a priority of the data packet 700. Additionally, the data packet 700 includes a critical request field (CRF) 725 for indicating a critical request flow for differentiating between data packets of equal priority or further specifying the virtual channel, and a cyclical redundancy code field (CRC) 730 for a cyclical redundancy code. In various embodiments, the data packet 700 includes additional fields in the packet header 705. For example, the packet header 705 may include a field for indicating a destination identifier (e.g., destination identifier 410).

When the field virtual channel field 715 contains a value of zero (e.g., 0b0), the priority field 720 and the critical request field 725 together contain priority bits indicating a priority of the data packet 700 and the virtual channel field 715 indicates virtual channel zero (VC0) for the data packet 700, in conformance with the sRIO 2.0 standard. Moreover, although the sRIO 1.3 standard does not specify virtual channels, the data packet 700 is backward compatible with the sRIO 1.3 standard and specifies a priority of the data packet 700 according to the sRIO 1.3 standard. Moreover, because the virtual channel field 715 of the data packet 700 indicates virtual channel zero (VC0) according to the sRIO 2.0 standard, the transmission protocol for the data packet 700 is a reliable transmission protocol.

When the virtual channel field 715 contains a value of one (e.g., 0b1), the priority field 720 and the critical request field 725 together contain a virtual channel identifier that identifies a higher-level virtual channel (e.g., VC1-VC8) for the data packet 700 in conformance with the sRIO 2.0 standard. Although the sRIO 1.3 standard does not specify virtual channels, the priority field 720 contains a priority according to the sRIO 1.3 standard and the critical request field 725 indicates whether the data packet 700 is to be routed using a critical request flow. Moreover, the contents of the priority field 720 and the critical request field 725 together identify a priority of the data packet 700 according to the sRIO 1.3 standard. Because the virtual channel field 715 of the data packet 700 indicates a virtual channel having a higher-level virtual channel (e.g., VC1-VC8), the transmission protocol for the data packet 700 may be either a reliable transmission protocol or a continuous transmission protocol according to the sRIO 2.0 standard. For example, the packet switch 105 may output the data packet 700 to an endpoint device 120 (e.g., a destination device) compliant with the sRIO 2.0 standard by using either a reliable transmission protocol or a continuous transmission protocol. As another example, the packet switch 105 may output the data packet 700 to an endpoint device 120 (e.g., a destination device) compliant with the sRIO 1.3 standard by using a reliable transmission protocol.

In various embodiments, the packet switch 105 receives a data packet 700 identifying a higher-level virtual channel (VC1-VC8) from an endpoint device 120 compliant with the sRIO 2.0 standard by using a reliable transmission protocol or a continuous transmission protocol and selects virtual channel zero (VC0) based on the data packet 700. Further, the packet switch routes the data packet 700 through the packet switch 105 and outputs the data packet 700 to an endpoint device 120 compliant with the sRIO 1.3 standard by using the selected virtual channel (VC0) and a reliable transmission protocol. In this way, an endpoint device 120 compliant with the sRIO 2.0 standard may effectively communicate with an endpoint device 120 compliant with the sRIO 1.3 standard by using a virtual channel.

In some embodiments, a port 125 of the packet switch 105 receives a data packet 700 conforming to the sRIO 2.0 standard. In turn, the port 125 modifies a virtual channel identifier in the data packet 700 by modifying at least one field in the data packet 700. For example, the port 125 may modify the virtual channel field 715, the priority field 720, the critical request field 725, or some combination thereof, in the data packet 700. In this way, the port 125 changes the virtual channel associated with the data packet 700. In various embodiments, the modified data packet 700 conforms to the sRIO 1.3 standard or the sRIO 2.0 standard, or both.

In some embodiments, a port 125 of the packet switch 105 receives a data packet 600 conforming to the sRIO 1.3 standard and modifies one or more fields in the data packet 600 so that the data packet 600 identifies a higher-level virtual channel and conforms to the sRIO 2.0 standard. For example, the port 125 may modify the reserved field 615, the priority field 620, or the critical request field 625, or some combination thereof, in the data packet 600. In some embodiments, a port 125 of the packet switch 105 receives a data packet 600 conforming to a serial RapidIO 1.3 standard and identifying virtual channel zero (VC0) according to the serial RapidIO 2.0 standard. Further, the port 125 modifies the reserved field 615, the priority field 620, or the CRF field 625, or any combination thereof, so that the data packet 600 includes a virtual channel identifier identifying a higher-level virtual channel (VC1-VC8) according to the sRIO 2.0 standard. In turn, the switch fabric 130 routes the data packet to a port 125 of the packet switch 105, and the port 125 outputs the data packet 600 to an endpoint device 120 compliant with the sRIO 2.0 standard by using the higher-level virtual channel identified by the virtual channel identifier in the data packet 600.

Figure 8:
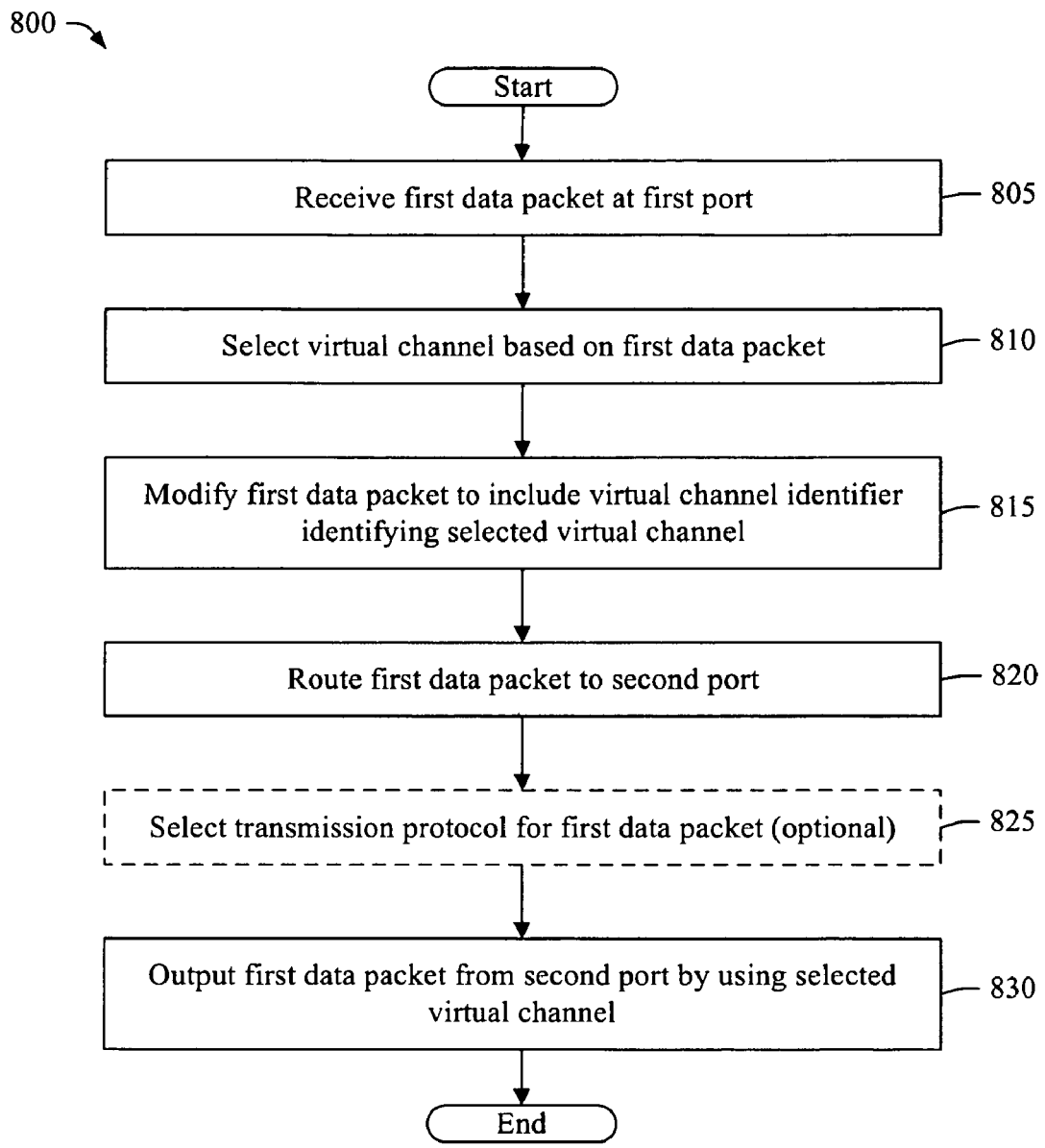
FIG. 8 is a flow chart of a method of routing a data packet through a packet switch by using a virtual channel, in accordance with an embodiment of the present invention.

FIG. 8 illustrates a method 800 of routing a data packet through a packet switch by using a virtual channel. In step 805, a first data packet is received at a first port of a packet switch. In various embodiments, a first port 125 of the packet switch 105 receives the first data packet from the endpoint device 120 corresponding to the first port 125. In various embodiments, the first data packet conforms to the sRIO 1.3 standard or the sRIO 2.0 standard, or both. The method 800 then proceeds to step 810.

In step 810, a virtual channel is selected for the first data packet based on the first data packet. In various embodiments, the first port 125 of the packet switch 105 selects the virtual channel for the first data packet based on the first data packet. For example, the first port 125 may select a virtual channel for the first data packet based on a field, a destination identifier, or a data payload in the first data packet, or some combination thereof. The method 800 then proceeds to step 815.

In step 815, the first data packet is modified to include a virtual channel identifier identifying the selected virtual channel. In some embodiments, the first port 125 modifies the first data packet to include a virtual channel identifier identifying the virtual channel selected for the first data packet. For example, the first port 125 may modify one or more fields in the first data packet to modify a virtual channel identifier in the first data packet so that the modified virtual channel identifier identifies the selected virtual channel. Additionally, the first port 125 calculates a cyclical redundancy code for the first data packet (e.g., the modified first data packet) and replaces the cyclical redundancy code in the first data packet with the calculated cyclical redundancy code. For example, the first port 125 may store the calculated cyclical redundancy code in a field of the first data packet. In various embodiments, the modified first data packet conforms to the sRIO 1.3 standard or the sRIO 2.0 standard, or both. The method 800 then proceeds to step 820.

In step 820, the first data packet is routed to a second port of the packet switch. In various embodiments, the switch fabric 130 uses a round robin algorithm to route the first data packet to a second port 125 of the packet switch 105 based on the first data packet. For example, the first port 125 may identify a port identifier based on the destination identifier in the first data packet and the switch fabric 130 may use the round robin algorithm to route the first data packet to the second port 125 based on the port identifier. In some embodiments, the switch fabric 130 routes the first data packet to the second port 125 by using the selected virtual channel identifier.

In some embodiments, the first port 125 identifies the data packet as a multicast data packet and identifies multiple port identifiers based on the route table 200 and contents (e.g., a destination identifier) in the data packet. In turn, the switch fabric 130 routes the data packet to each port 125 identified by the port identifiers. In a further embodiment, the first port 125 may select one or more virtual channels for routing the data packet (e.g., the multicast packet) through the packet switch 105. For example, the first port 125 may select virtual channel one (VC1) for the data packet routed to one port 125 and virtual channel five (VC5) for the data packet routed to another port 125. The method 800 then proceeds to step 825.

In optional step 825, a transmission protocol is selected for the first data packet. In various embodiments, the second port 125 selects the transmission protocol for the first data packet. The transmission protocol may be a reliable transmission protocol, a continuous transmission protocol, or a pseudo-continuous transmission protocol. In some embodiments, the first port 125 selects the transmission protocol for the first data packet before the packet switch 105 routes the first data packet from the first port 125 to the second port 125. The method 800 then proceeds to step 830.

In step 830, the first data packet is output from the second port of the packet switch by using the selected virtual channel. In various embodiments, the second port 125 outputs the first data packet from the packet switch 105 by using the selected virtual channel. For example, the selected virtual channel may be allocated a portion of a link bandwidth of the second port 125 and the second port 125 may use the selected virtual channel to output the first data packet to the endpoint device 120 corresponding to the second port 125. In some embodiments, the first data packet output from the packet switch 105 conforms to the sRIO 1.3 standard and the endpoint device 120 corresponding to the second port 125 conforms to the sRIO 1.3 standard. In other embodiments, the first data packet output from the packet switch 105 conforms to the sRIO 2.0 standard and the endpoint device 120 corresponding to the second port 125 conforms to the sRIO 2.0 standard. In various embodiments, the second port 125 outputs the first data packet from the packet switch 105 by using the transmission protocol selected for the first data packet. The method 800 then ends.

In various embodiments, the method 800 may include more or fewer steps than the steps 805-830 described above and illustrated in FIG. 8. In some embodiments, one or more of the steps 805-830 of the method 800 may be performed in parallel or substantially simultaneously. In various embodiments, the steps 805-830 of the method 800 may be performed in a different order than the order described above and illustrated in FIG. 8.

Figure 9:
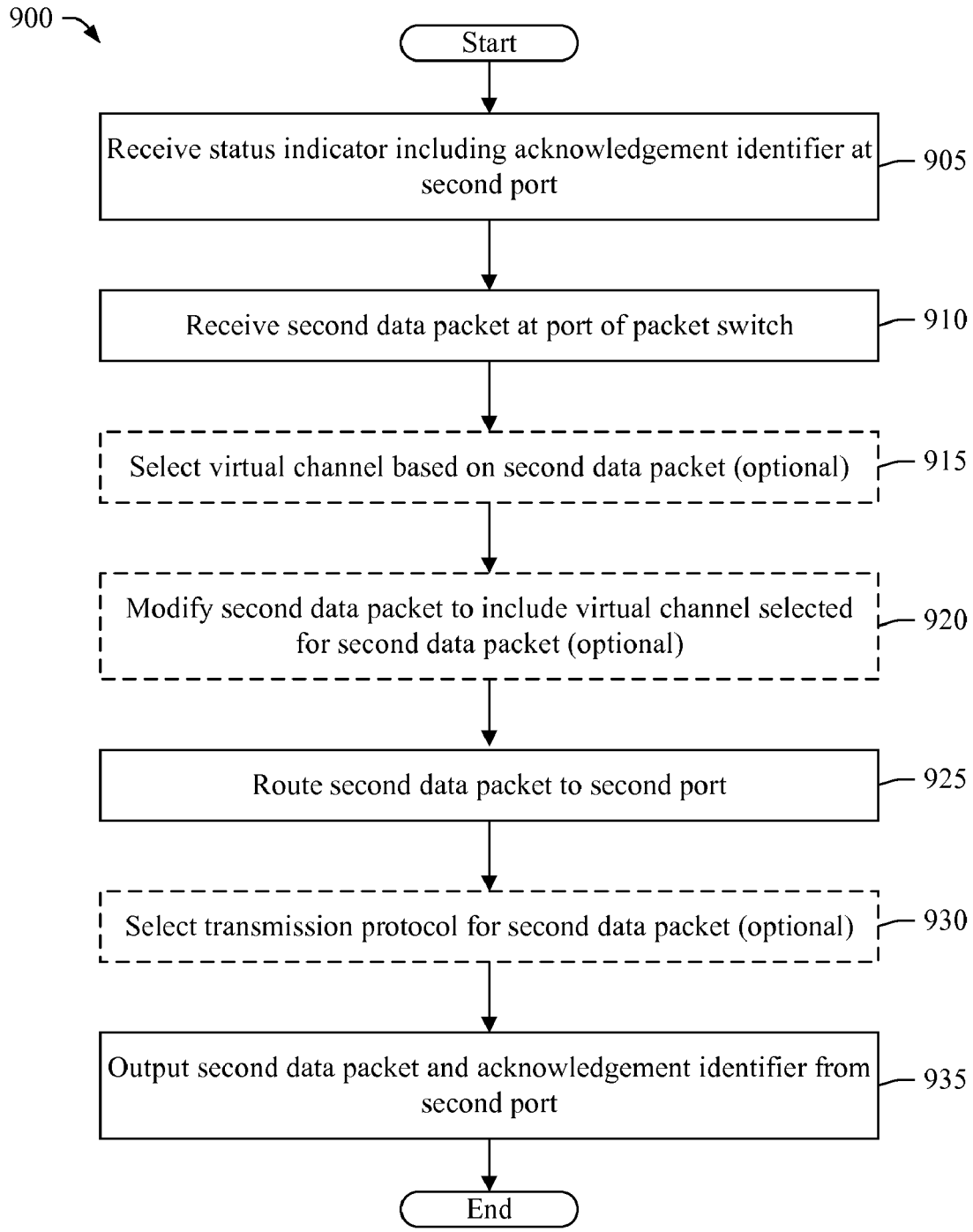
FIG. 9 is a flow chart of a method of routing a data packet through a packet switch by using a virtual channel, in accordance with an embodiment of the present invention.

FIG. 9 illustrates a method 900 of routing a data packet through a packet switch by using a virtual channel. In some embodiments, the method 900 is part of the method 800 and follows step 830 of the method 800. In these embodiments, the second port 125 outputs an acknowledgement identifier from the packet switch 130 along with the first data packet in step 830.

In step 905, a status indicator including an acknowledgement identifier is received at the second port of the packet switch. In various embodiments, the second port 125 of the packet switch 105 receives a status indicator from the endpoint device 120 corresponding to the second port 125 in response to the first data packet output from the second port 125. For example, the endpoint device 120 may receive the acknowledgement identifier along with the first data packet, generate the status indicator in response to receiving the first data packet, and send the status indicator to the second port 125. In various embodiments, the status indicator includes one or more control symbols. In some embodiments, the first data packet includes the acknowledgement identifier. The method 900 then proceeds to step 910.

In step 910, a second data packet is received at a port of the packet switch. In various embodiments, the first port 125 of the packet switch 105 receives a second data packet from the endpoint device 120 corresponding to the first port 125. In various embodiments, the second data packet conforms to the sRIO 1.3 standard or the sRIO 2.0 standard, or both. In some embodiments, the first data packet and the second data packet include a same destination identifier. In other embodiments, a port 125 (e.g., a third port 125) other than the first port 125 receives the second data packet. The method 900 then proceeds to step 915.

In optional step 915, a virtual channel is selected based on the second data packet. In various embodiments, the port 125 that received the second data packet selects a virtual channel based on the second data packet. In some embodiments, the first port 125 of the packet switch 105 selects a virtual channel based on the second data packet. For example, the first port 125 may select a virtual channel for the second data packet based on a field or a destination identifier, or both, in the second data packet. In some embodiments, the virtual channel selected for the second data packet is the same virtual channel selected for the first data packet. The method 900 then proceeds to step 920.

In optional step 920, the second data packet is modified to include the virtual channel selected for the second data packet. In various embodiments, the port 125 (e.g., the input port 125) that received the second data packet modifies the second data packet to include a virtual channel identifier identifying the virtual channel selected for the second data packet. For example, the port 125 that received the second data packet may modify a virtual channel identifier in the second data packet to identify the selected virtual channel.

In some embodiments, the first port 125 modifies the second data packet to include a virtual channel identifier identifying the virtual channel selected for the second data packet. For example, the first port 125 may modify one or more fields in the second data packet. Additionally, the first port 125 calculates a cyclical redundancy code for the second data packet (e.g., the modified second data packet) and replaces the cyclical redundancy code in the second data packet with the calculated cyclical redundancy code. For example, the first port 125 may store the calculated cyclical redundancy code in a field of the second data packet. In various embodiments, the second data packet (e.g., the modified second data packet) conforms to the sRIO 1.3 standard or the sRIO 2.0 standard, or both. The method 900 then proceeds to step 925.

In step 925, the second data packet is routed to the second port of the packet switch. In various embodiments, the switch fabric 130 routes the second data packet to the second port 125 based on the second data packet. For example, the switch fabric 130 may route the second data packet to the second port 125 based on a destination identifier in the second data packet. The method 900 then proceeds to step 930.

In optional step 930, a transmission protocol is selected for the second data packet. In various embodiments, the second port 125 selects a transmission protocol for the second data packet. The transmission protocol may be a reliable transmission protocol, a continuous transmission protocol, or a pseudo-continuous transmission protocol. In some embodiments, the first port 125 selects the transmission protocol for the second data packet before the packet switch 105 routes the second data packet from the first port 125 to the second port 125. In various embodiments, the transmission protocol selected for the second data packet is the same as the transmission protocol selected for the first data packet. The method 900 then proceeds to step 935.

In step 935, the second data packet and the acknowledgement identifier are output from the second port of the packet switch. In various embodiments, the second port 125 outputs the second data packet from the packet switch 105 along with the acknowledgement identifier of the first data packet. For example, the second port 125 may output the second data packet and the acknowledgement identifier of the first data packet to the endpoint device 120 corresponding to the second port 125 by using a virtual channel identified by a virtual channel identifier in the second data packet. In some embodiments, the second data packet output from the packet switch 105 conforms to the sRIO 1.3 standard and the endpoint device 120 corresponding to the second port 125 conforms to the sRIO 1.3 standard. In other embodiments, the second data packet output from the packet switch 105 conforms to the sRIO 2.0 standard and the endpoint device 120 corresponding to the second port 125 conforms to the sRIO 2.0 standard. In various embodiments, the second port 125 outputs the second data packet from the packet switch 105 by using the transmission protocol selected for the second data packet. In some embodiments, the second data packet includes the acknowledgement identifier of the first data packet. The method 900 then ends.

In various embodiments, the method 900 may include more or fewer steps than the steps 905-935 described above and illustrated in FIG. 9. In some embodiments, one or more of the steps 905-935 of the method 900 may be performed in parallel or substantially simultaneously. In various embodiments, the steps 905-935 of the method 900 may be performed in a different order than the order described above and illustrated in FIG. 9.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch, comprising:
a plurality of ports comprising:
a first port configured to receive a first data packet including a packet header including a first field and a second field, the first field of the first data packet indicating the second field of the first data packet identifies a priority of the first data packet, the second field of the first data packet identifying the priority of the first data packet, the first port further configured to modify the first field of the first data packet to indicate the second field of the first data packet identifies a virtual channel for the first data packet; and
a second port configured to output the first data packet from the packet switch by using the virtual channel identified by the second field of the first data packet; and
a switch fabric coupled to the plurality of ports, the switch fabric configured to route the first data packet to the second port.

2. The packet switch of claim 1, wherein the plurality of ports further comprises:
a third port configured to receive a second data packet including a packet header including a first field and a second field, the first field of the second data packet indicating the second field identifies a virtual channel for the second data packet, the second field of the second data packet identifying the virtual channel for the second data packet, the third port further configured to modify the first field of the second data packet to indicate the second field of the second data packet identifies a priority of the second data packet; and
a fourth port configured to output the second data packet from the packet switch by using the priority identified by the second field of the second data packet, wherein the switch fabric is configured to route the second data packet to the fourth port.

3. The packet switch of claim 1, wherein the first field is defined as a reserved field according to a Serial RapidIO 1.3 Specification and is defined as a virtual channel field according to a Serial RapidIO 2.0 Specification.

4. The packet switch of claim 1, wherein the first port is further configured to modify the second field of the first data packet to identify the virtual channel for the first data packet.

5. The packet switch of claim 1, wherein the second port has a bandwidth and the virtual channel identified by the second field of the first data packet has an allocated portion of the bandwidth of the second port.

6. The packet switch of claim 1, wherein the second port is further configured to select either a reliable communication protocol or a lossy communication protocol for outputting the first data packet from the packet switch.

7. The packet switch of claim 1, wherein the packet switch is configured to route data packets from a source device conforming to a Serial RapidIO 1.3 Specification to a destination device conforming to a Serial RapidIO 2.0 Specification through virtual channels of the packet switch.

8. The packet switch of claim 1, wherein the switch fabric is further configured to multicast the first data packet by selecting a plurality of virtual channels and routing the first data packet to at least two ports of the plurality of ports by using the plurality of virtual channels.

9. A packet switch comprising:
a plurality of ports comprising:
a first port configured to receive a first data packet identifying a virtual channel and select another virtual channel based on the first data packet;
a second port configured to output the first data packet from the packet switch by using the selected virtual channel; and
a switch fabric coupled to the plurality of ports, the switch fabric configured to route the first data packet to the second port, wherein the second port is further configured to receive a status indicator indicating the first data packet was not accepted by a destination device and including an acknowledgement identifier in response to outputting the first data packet from the second port, a port of the plurality of ports is configured to receive a second data packet, the switch fabric is further configured to route the second data packet to the second port, and the second port is further configured to output the second data packet from the packet switch along with the acknowledgement identifier.

10. A packet switch, comprising:
a plurality of ports comprising:
a first port configured to receive a first data packet including a packet header including a first field and a second field, the first field of the first data packet defined as a reserved field according to a Serial RapidIO 1.3 Specification and defined as a virtual channel field according to a Serial RapidIO 2.0 Specification, the first port further configured to determine the first field of the first data packet identifies a first virtual channel, select a second virtual channel based on the first data packet, modify the second field of the first data packet to identify the second virtual channel, and modify the first field of the first data packet to indicate the second field identifies the second virtual channel, the second virtual channel being different from the first virtual channel; and
a second port configured to output the first data packet from the packet switch by using the second virtual channel; and
a switch fabric coupled to the plurality of ports, the switch fabric configured to route the first data packet to the second port.

11. The packet switch of claim 10, further comprising:
a third port configured to receive a second data packet including a header including a first field and a second field, the first field of the second data packet defined as a reserved field according to the Serial RapidIO 1.3 Specification and defined as a virtual channel field according to the Serial RapidIO 2.0 Specification, the third port further configured to determine the second field of the second data packet identifies a third virtual channel based on the first field of the second data packet, and modify the first field of the second data packet to identify a fourth virtual channel, the third virtual channel being different from the fourth virtual channel; and a fourth port configured to output the second data packet from the packet switch by using the fourth virtual channel, wherein the switch fabric is further configured to route the second data packet to the fourth port.

12. The packet switch of claim 10, wherein the first port is further configured to receive the first data packet by using a reliable communication protocol, and the second port is further configured to output the first data packet from the packet switch by using a lossy communication protocol.

13. The packet switch of claim 10, wherein the packet switch is configured to route data packets from a source device conforming to a Serial RapidIO 1.3 Specification to a destination device conforming to a Serial RapidIO 2.0 Specification by using virtual channels of the packet switch.

14. The packet switch of claim 10, wherein the second port has a bandwidth and the second virtual channel has an allocated portion of the bandwidth of the second port.

15. The packet switch of claim 10, wherein the switch fabric is further configured to multicast the first data packet by selecting a plurality of virtual channels and routing the first data packet to at least two ports of the plurality of ports by using the plurality of virtual channels.

16. The packet switch of claim 10, wherein the second port is further configured to select either a reliable communication protocol or a lossy communication protocol for outputting the first data packet from the packet switch.

17. A communication system comprising:
a source device;
a destination device;
a packet switch coupled to the source device and the destination device, the packet switch comprising:
a plurality of ports comprising:
a first port configured to receive a first data packet identifying a virtual channel from the source device and select another virtual channel based on the first data packet; and
a second port configured to output the first data packet to the destination device by using the selected virtual channel; and
a switch fabric coupled to the plurality of ports, the switch fabric configured to route the first data packet to the second port, wherein the second port is further configured to receive a status indicator indicating the first data packet was not accepted by the destination device and including an acknowledgement identifier from the destination device in response to outputting the first data packet from the second port, a port of the plurality of ports is configured to receive a second data packet, the packet switch is further configured to route the second data packet to the second port, and the second port is further configured to output the second data packet to the destination device along with the acknowledgement identifier.

18. A method of routing a data packet through a packet switch, the method comprising:
receiving a first data packet at a first port of the packet switch, the first data packet including a packet header including a first field defined as a reserved field according to a Serial RapidIO 1.3 Specification and defined as a virtual channel field according to a Serial RapidIO 2.0 Specification, the packet header identifying a first virtual channel for the first data packet based on the first field;

modifying the packet header of the first data packet to identify a second virtual channel by modifying the first field of the first data packet, the second virtual channel being different from the first virtual channel;

routing the first data packet to a second port of the packet switch; and outputting the first data packet from the packet switch at the second port by using the second virtual channel.

19. The method of claim 18, further wherein modifying the packet header of the first data packet to identify the second virtual channel comprises modifying a second field of the first data packet to identify the second virtual channel.

20. The method of claim 18, wherein the packet switch is configured to route data packets from a source device conforming to a Serial RapidIO 1.3 Specification to a destination device conforming to a Serial RapidIO 2.0 Specification by using virtual channels of the packet switch.

21. The method of claim 18, wherein receiving the first data packet at the first port of the packet switch is performed by using a reliable communication protocol, and outputting the first data packet from the packet switch at the second port is performed by using a lossy communication protocol.

22. The method of claim 18, wherein the second port has a bandwidth and the second virtual channel has an allocated portion of the bandwidth of the second port.

23. The method of claim 18, further comprising selecting either a reliable communication protocol or a lossy communication protocol for outputting the first data packet from the packet switch at the second port.

24. The method of claim 18, wherein routing the first data packet to the second port of the packet switch comprises selecting a plurality of virtual channels and multicasting the first data packet to at least two ports of the packet switch by using the plurality of virtual channels.

25. A method of routing a data packet through a packet switch, the method comprising:
receiving a first data packet identifying a virtual channel at a first port of the packet switch;
selecting another virtual channel based on the first data packet;
routing the first data packet to a second port of the packet switch;
outputting the first data packet from the packet switch at the second port by using the selected virtual channel;
receiving a status indicator indicating the first data packet was not accepted by a destination device and including an acknowledgement identifier at the second port in response to outputting the first data packet from the second port;
receiving a second data packet at a port of the packet switch;
routing the second data packet to the second port; and
outputting the second data packet from the packet switch at the second port along with the acknowledgement identifier.

* * * * *